United States Patent
Takano et al.

(10) Patent No.: US 6,391,085 B1
(45) Date of Patent: May 21, 2002

(54) METAL FEEDSTOCK FROM WASTED METAL PRODUCTS

(75) Inventors: Hiroshi Takano, Kouka-gun; Tetsushi Yonekawa, Otsu; Yoshihiro Ogawa, Kusatsu; Takashi Okada, Yasu-gun, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/862,314

(22) Filed: May 23, 2001

Related U.S. Application Data

(62) Division of application No. 09/456,838, filed on Dec. 7, 1999.

(30) Foreign Application Priority Data

Dec. 16, 1998 (JP) .......................................... 10-357477

(51) Int. Cl.[7] ................................................ C22B 1/14
(52) U.S. Cl. ........................... 75/316; 75/770; 428/688; 428/576
(58) Field of Search ........................ 75/316, 572, 770; 428/688, 576

(56) References Cited

U.S. PATENT DOCUMENTS

| | | | | |
|---|---|---|---|---|
| 2,100,537 A | * | 11/1937 | Conway ..................... | 228/190 |
| 3,180,249 A | | 4/1965 | Patros ......................... | 100/39 |
| 3,807,986 A | * | 4/1974 | Funk et al. ................. | 428/546 |
| 3,864,092 A | * | 2/1975 | Ravitz ........................ | 264/122 |
| 3,948,612 A | | 4/1976 | Schulten-Baumer ....... | 29/187.5 |

FOREIGN PATENT DOCUMENTS

| | | |
|---|---|---|
| DE | 22 36 791 | 2/1973 |
| DE | 22 39 499 | 2/1974 |
| DE | 33 47 230 | 7/1985 |
| EP | 0 524 396 | 1/1993 |
| FR | 2 553 684 | 4/1985 |
| GB | 1 454 892 | 11/1976 |

OTHER PUBLICATIONS

Patent Abstracts of Japan, vol. 7, No. 149, Jun. 30, 1983, & JP 58 058999 A, Apr. 7, 1983 * abstract *.
Patent Abstracts of Japan, vol. 1996, No. 5, May 31, 1996, & JP 08 010743 A, Jan. 16, 1996 * abstract *.

* cited by examiner

*Primary Examiner*—Roy King
*Assistant Examiner*—Tima McGuthry-Banks
(74) *Attorney, Agent, or Firm*—Wenderoth, Lind & Ponack, L.L.P.

(57) ABSTRACT

A metal feedstock from wasted metal products is disclosed. The feedstock is formed by crushing the metal products into pieces; magnetically separating sheet-shaped ferrous scraps and ferrous cast blocks from the crushed pieces; placing the cast blocks between the sheet-shaped scraps to make a sandwich structure; and pressing the sandwich structure to form a metal feedstock.

5 Claims, 5 Drawing Sheets

METAL FEEDSTOCK FROM WASTED METAL PRODUCTS

This is divisional of application Ser. No. 09/456,838 filed Dec. 7, 1999.

BACKGROUND OF THE INVENTION

1. Field of the Invention

The present invention relates generally to the recycle of wasted metal products and, more particularly, to the preparation of metal feedstock from wasted metal products such as, for example, metallic component parts of electric products including, for example, air conditioners or refrigerators.

2. Description of the Prior Art

In the conventional recycling practice, crushed pieces of a wasted metal product are first separated into ferrous and non-ferrous materials by the utilization of magnetism and the ferrous materials so separated are, without being further sorted, charged into a cupola to produce a ferrous feedstock. To feed the ferrous materials into the cupola, the ferrous material must be in the form of bricks of a size comparable to that of a refractory brick so that the ferrous materials will not be blown up by a hot blast within the cupola.

To prepare the ferrous bricks, the ferrous materials may be pressed together by the use of, for example, a press. However, if the ferrous materials include both sheet-shaped scraps, regardless of whether flat or deformed, and cast blocks, the cast blocks often render it difficult for the ferrous materials to be pressed into the ferrous bricks. Accordingly, the magnetically separated ferrous materials have been utilized only as a low-quality scrap.

In some case, the sheet-shaped ferrous scraps are further separated from the cast blocks and pressed together for reuse as a metal feedstock. The pressed iron scraps are fed into a melting furnace such as a cupola or an electric furnace. In that case, however, after feeding the metal feedstock into the furnace, a mixture of component adjusters such as carbon, silicon, manganese, phosphorus and/or sulfur must be fed into the furnace to adjust the concentration of impurities contained in the melt within the furnace. Those component adjusters must be mixed in a mixing ratio that is determined depending on the application for which the material recycled from the metal feedstock is intended to use. By way of example, the metal feedstock is to be eventually used as a material for component parts of an electric compressor to a type generally used in air-conditioner or refrigerators, the following compositions as shown in Table 1 is required.

TABLE 1

|  | C | Si | Mn | P | S | Ti | Sb | Cr |
|---|---|---|---|---|---|---|---|---|
| Cylinder | 3.50 | 2.50 | 0.50 | 0.10 | 0.10 | 0.10 | 0.02 | — |
| Shaft | 3.20 | 2.40 | 0.50 | 0.10 | 0.10 | — | 0.02 | 0.50 |
| Piston | 3.20 | 2.40 | 0.50 | 0.10 | 0.10 | — | 0.02 | 0.50 |
| Bearing | 3.20 | 2.40 | 0.50 | 0.10 | 0.10 | — | 0.02 | 0.50 |

Since these component adjusters are relatively lightweight, they tend to float in a top layer of the ferrous melt within the furnace. The component adjusters afloat on the top layer of the melt without being well mixed in the melt are apt to be oxidized and become dross. This brings about problems associated with low efficiency of utilization of the component adjusters and increase in quantity of dust. Further, there are problems in that feeding of the adjusters is hazardous and also in that an extra process of removing the dross is required.

SUMMARY OF THE INVENTION

It is accordingly an objective of the present invention to enable the metal feedstock to be efficiently and safely prepared from wasted metal products to recycle the metal products without the efficiency of utilization of the component adjusters being lowered.

Another objective of the present invention is to provide the metal feedstock which when fed into a cupola will neither fly nor break up during falling downwardly within the cupola.

For this purpose, the present invention provides a method of and an apparatus for making the metal feedstock from the wasted metal products. According to the present invention, the metal feedstock can be prepared from wasted metal products by crushing the metal products into pieces; magnetically separating the crushed pieces into sheet-shaped ferrous scraps and ferrous cast blocks; placing the ferrous cast blocks between the sheet-shaped ferrous scraps to make a sandwich structure; and pressing the sandwich structure to form the ferrous feedstock.

According to the present invention, the sheet-shaped scraps and the cast blocks are firmly bound together to form a heavy metal feedstock. The metal feedstock will not fly up in the cupola and is efficiently utilized as a casting material.

In a preferred embodiment of the invention, the magnetically separating step includes a first-separation step separating the sheet-shaped ferrous scraps, and a second-separation step separating the ferrous cast blocks. A magnetic flux density around the crushed pieces employed during the second-separation step is preferably set at a value higher than that that during the first-separation step. This relationship assists in improving the efficiency of recovery of iron pieces and reducing the content of copper in the resultant ferrous feedstock.

In another embodiment of the invention, after the magnetical separating step, the ferrous cast blocks smaller than a predetermined size may be further separated. Since the ferrous cast blocks larger than the predetermined size can be fed into the cupola without pressing process, that further separation improves a productivity of the metal feedstock.

A weight percentage of the sheet-shaped ferrous scraps in the sandwich structure is preferably greater than 60% to prevent disassembling of the resultant metal feedstock during falling in the cupola.

In a further embodiment of the invention, content adjusters may be mixed in the sandwich structure. This eliminates the hazardous process of adding the content adjuster to the melted iron in the cupola. By combining the content adjusters with the sandwich structure, the adjusters will sink in the melted iron and will not oxidized. Thus, mixing of the content adjusters can take place smoothly and the efficiency of utilization of the adjusters can be increased.

In a second aspect of the present invention, an apparatus for forming a metal feedstock from wasted metal products comprises:

first, second and third measuring means for measuring out an amount of iron pieces, wherein said first and second measuring means are for sheet-shaped ferrous scraps and said second measuring means is for ferrous cast blocks, said scraps and blocks being obtained by crushing waste metal products;

a third measuring means for measuring an amount of the sheet-shaped ferrous scraps;

transport means for successively transporting the sheet-shaped scraps, the cast blocks and the sheet-shaped scraps that have been measured by said first, second and third measuring means respectively;

a holding means for receiving and holding the sheet-shaped scraps, the cast blocks and the sheet-shaped scraps transported by said transport means; and a pressing means for simultaneously pressing the sheet-shaped scraps, the cast blocks and the sheet-shaped scraps in said holding means to form a cast feedstock of a sandwich structure.

According to the apparatus of the present invention, a predetermined amount of sheet-shaped scraps and cast blocks are pressed together to form a sandwich-structured cast feedstock. Thus, the apparatus of the invention is capable of recycling the wasted metal products efficiently.

The apparatus of the invention may comprise a crushing means for crushing the metal products and a separating means for separating the crushed metal products.

Preferably, the apparatus of the present invention further comprises a supplying means for supplying at least one content adjuster to the transport means. The content adjuster supplied to the transport means is mixed in the sandwich-structured cast feedstock.

In a third aspect of the present invention, a metal feedstock comprises cast blocks and sheet-shaped scraps wherein the cast blocks are disposed between the sheet-shaped scraps and pressed together to form a sandwich-structured metal feedstock. The cast feedstock is firmly bounded and heavy enough to fall in the cupola.

BRIEF DESCRIPTION OF THE DRAWINGS

The above and other objectives and features of the present invention will become more apparent from description of a preferred embodiment thereof with reference to the accompanying drawings, throughout which like parts are designated by like reference numerals, and wherein.

DETAILED DESCRIPTION OF THE PREFERRED EMBODIMENTS

The application is based on an application No. 10-357477 filed in Japan, the content of which is incorporated herein by reference.

Figure 1:
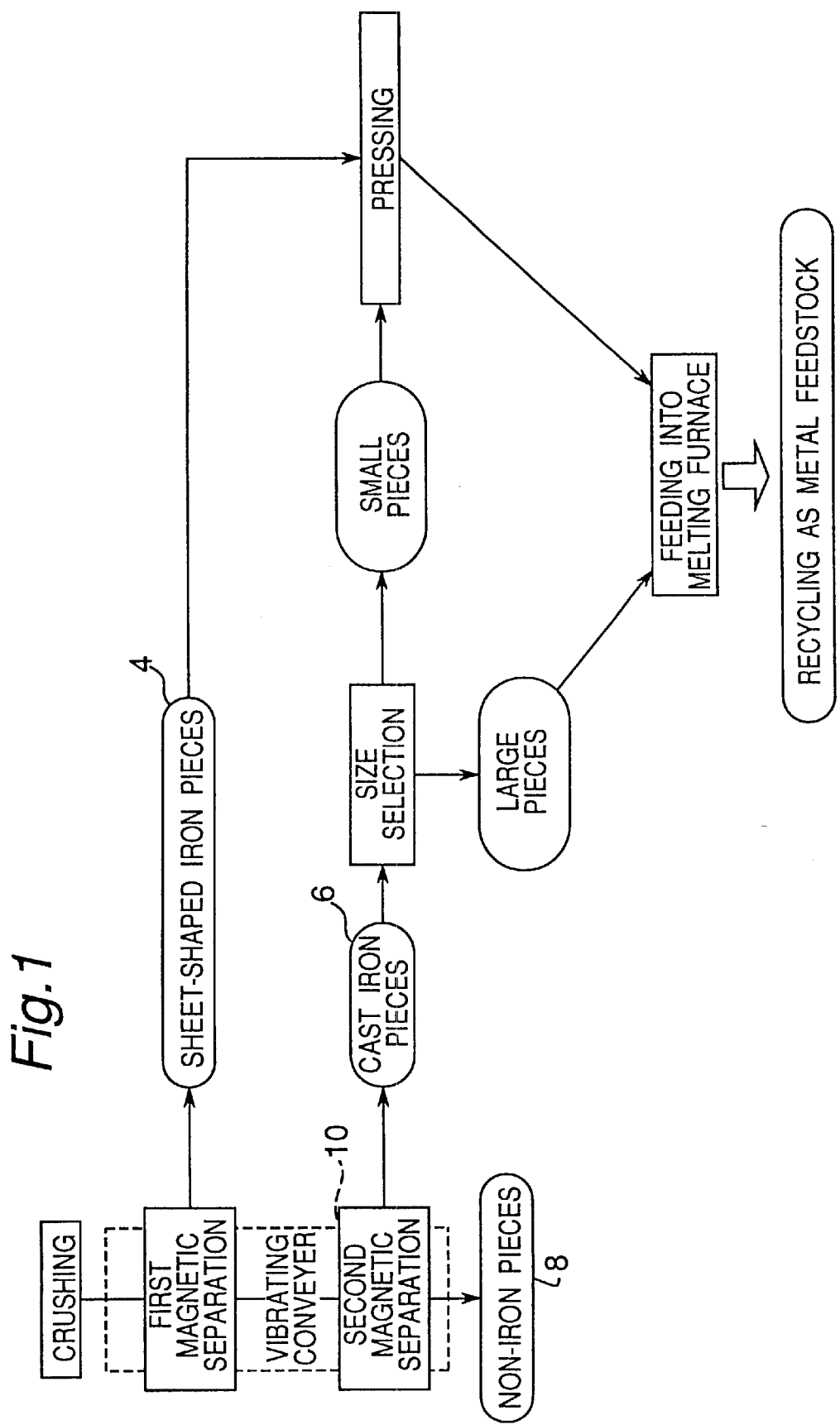
FIG. 1 is a block diagram showing a method of forming a metal feedstock from wasted metal products according to a preferred embodiment of the present invention.

Referring to FIG. 1, wasted metal products are crushed into iron pieces including sheet-shaped iron pieces and cast iron pieces 4 and 6 and non-iron pieces 8. Thereafter, a magnetic separator separates the iron pieces from the non-iron pieces 8. The iron pieces are then fed into a melting furnace such as a cupola or an electric furnace to recycle the iron pieces as a metal feedstock.

Figure 2:
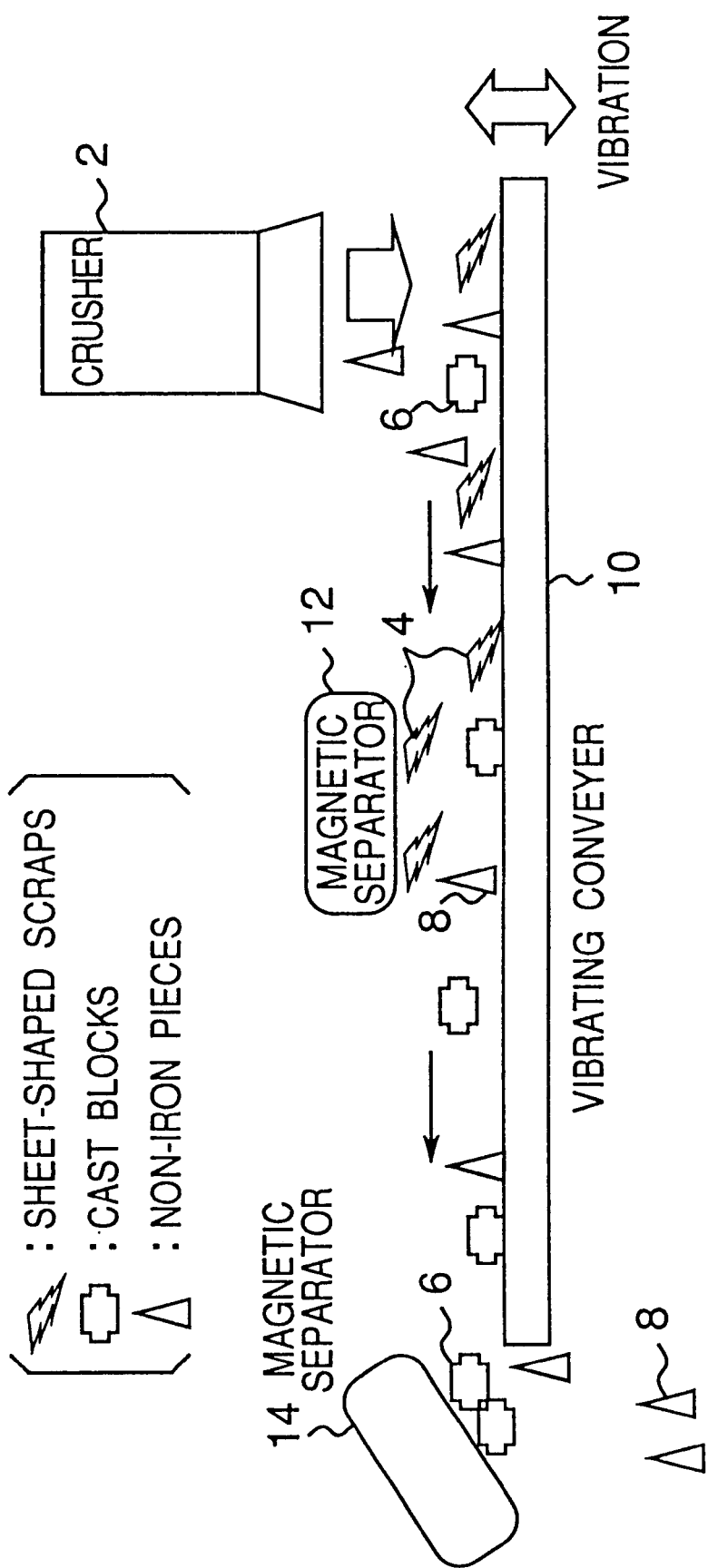
FIG. 2 is a schematic diagram showing steps of crushing and separating metal products.

Respective steps of crushing and separating the wasted products are shown in FIG. 2. The wasted products are fed in a crusher 2 and are crushed into the iron and non-iron pieces. These crushed pieces are transported below a first magnetic separator 12 and a second magnetic separator 14 by means of a vibrating conveyer 10 so that the crushed pieces can be separated into the sheet-shaped scraps 4, cast blocks 6 and non-iron scraps 8.

The first separator 12 attracts only the sheet-shaped scraps 4 from the crushed pieces, the rest of which, i.e., the cast blocks 6 and the non-iron pieces 8 are further transported toward the second magnetic separator 14 by means of the conveyer 10 (first magnetic separation). The second separator 14 attracts mainly the cast blocks 14 (second magnetic separation). The non-iron pieces 8 that have not been attracted by the separator 14 fall down from the conveyer 10.

The magnetic force of the second separator 14 is set to a value greater than that of the first separator 12 so that the second separator 14 can attract all the iron pieces that have not been attracted by the first separator 12.

The various size of pieces attracted by the second separator 14 are divided into two groups by a sizeselecting means such as a sieve or a magnetic separator: one group includes pieces larger than a predetermined size, for example, 20 mm square, and the other group includes pieces smaller than that size. The first group of the iron pieces are directly fed into a cupola. On the other hand, the second group of the iron pieces are pressed with the sheet-shaped scraps 4, separated by the first separator 12, because the pieces smaller than the predetermined size tend to be blown up by an uprising blast within the cupola.

Figure 3:
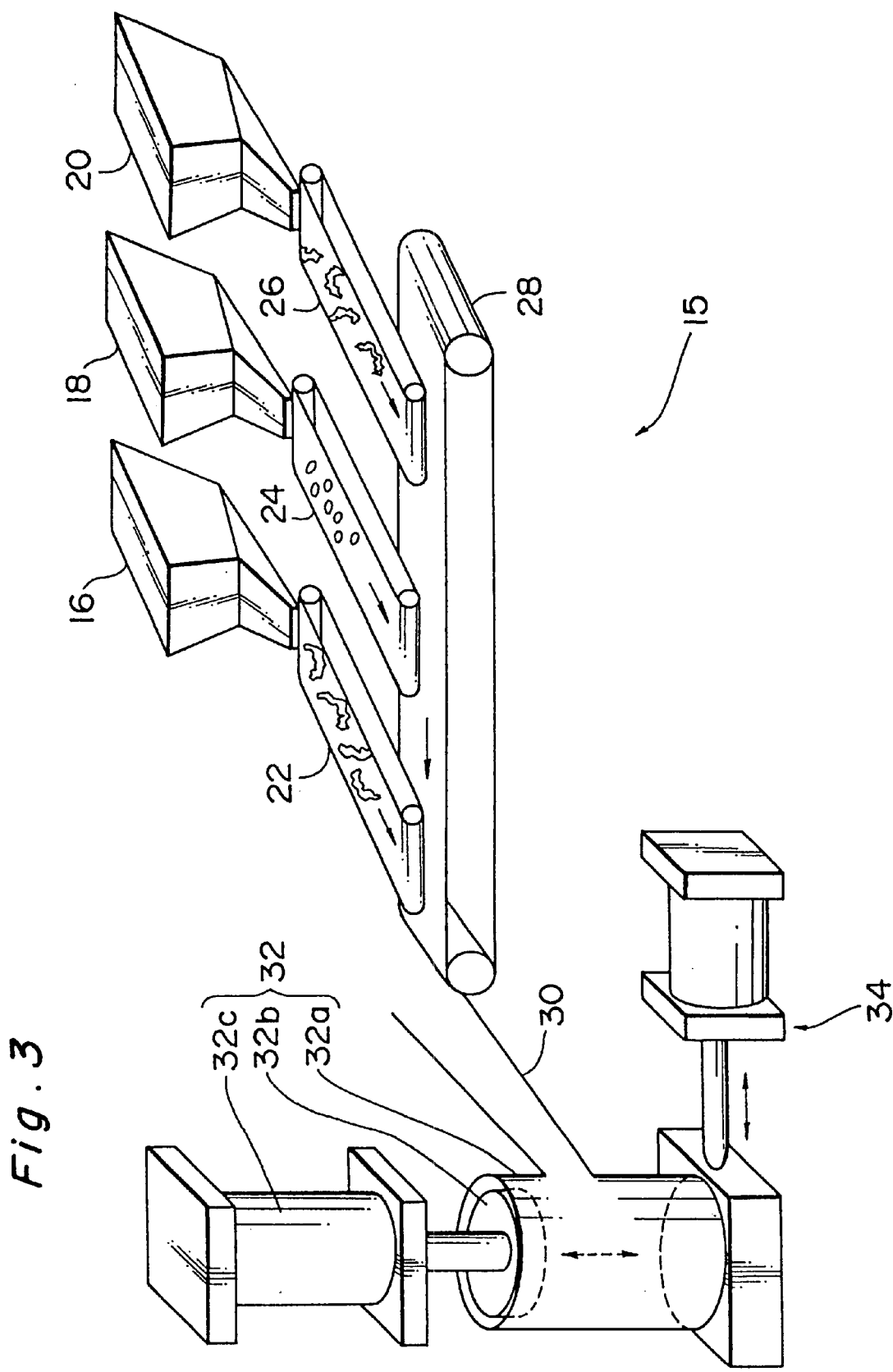
FIG. 3 is a partial perspective view of an apparatus for forming the metal feedstock from wasted metal products.

Referring to FIG. 3, a sandwich-press apparatus 15, which forms a metal feedstock from the sheet-shaped scraps 4 and the cast blocks 6, includes a first hopper 16 for receiving the iron scraps 4, a second hopper 18 for receiving the iron blocks 6 and a third hopper 20 for receiving the iron scraps 4. A first, second and third weighing conveyer 22, 24 and 26 are placed immediately beneath outlets of the first, second and third hopper 16, 18 and 20, respectively. A supplying conveyer 28 is placed under respective downstream ends of the weighing conveyers 22, 24 and 26. A supplying chute 30 is placed under a downstream end of the supplying conveyer 28. An outlet of the supplying chute 30 is connected to a barrel 32a, which is a part of a press 32. An ejecting device 34 is placed under the press 32 to eject a sandwich-like feedstock eventually formed by the press 32.

The operation of the sandwich-press apparatus 15 will be described. Among the pieces crushed and separated by the apparatus in FIG. 2, the sheet-shaped scraps 4 are fed into the first and third hopper 16 and 20. The cast blocks 6 smaller than the predetermined size are fed into the second hopper 18. The iron pieces received by the hopper 16, 18 and 20 are weighed and carried toward the supplying conveyer 28 by the weighing conveyers 22, 24 and 26, respectively. Then, the iron pieces received by the supplying conveyer 28 are successively delivered to the barrel 32a through the supplying shoot 30 in the order of the iron scraps 4, the iron blocks 6 and the iron scraps 4. The iron pieces loaded in the barrel 32a are pressed by a piston 32b connected to a cylinder 32c to thereby produce a metal feedstock. Then, the resultant metal feedstock is ejected from the press 32 by the ejecting device 34.

Figure 4:
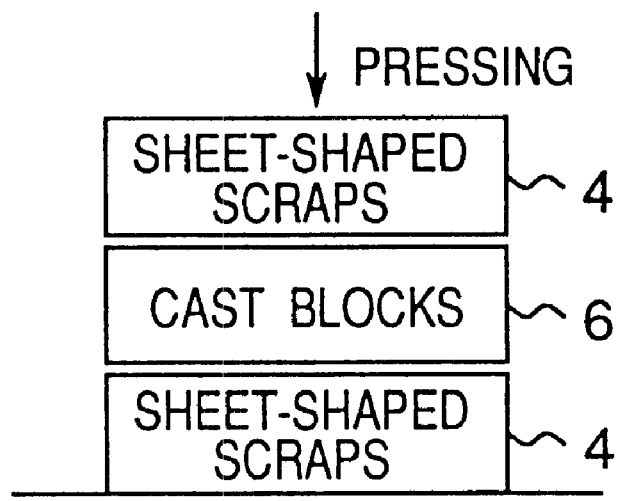
FIG. 4 is a schematic diagram showing a step of pressing sheet-shaped pieces and cast blocks separated from the crushed metal products.
Figure 5:
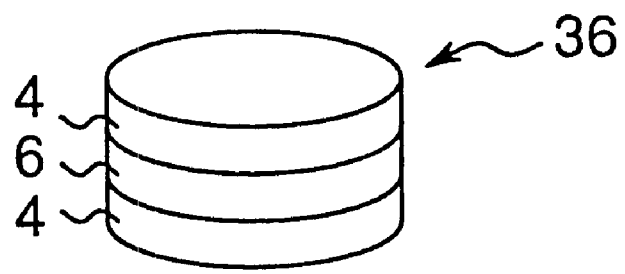
FIG. 5 is a perspective view of the metal feedstock that has been caked by press and has a sandwich structure.

To describe in detail with reference to FIG. 4, a predetermined amount of iron blocks 6, iron scraps 4 and iron scraps 4 are stacked one above the other with the iron blocks 6 intervening between the iron scraps 4. By pressing the layered iron pieces by the press 32, a sandwich-structured metal feedstock 36 as shown in FIG. 5 is formed. This feedstock 36 is heavy enough to fall without flying up by the blast in the cupola.

The sandwich-press apparatus 15 may include an adjuster hopper that receives the component adjuster. The received component adjuster is weighed and a predetermined amount thereof is fed on the supplying conveyer 28 between the iron scraps 4 fed by the conveyer 22 and that fed by the conveyer 26. Then, the component adjuster is pressed with the iron blocks 6 between two layers of the iron scraps 4. Thus, the component adjuster can be inserted into the feedstock.

Among five impurity elements in a cast iron (C, Si, Mn, P and S), Si and Mn are usually available as 50 mm-in-diameter grains and may be fed directly into the adjuster hopper. On the other hand, since C, P and S are usually available as 5 mm-in-diameter grains or 1~2 mm particles, they may be fed in a sack such as a paper bag. Other elements such as Ti, Sb or Cr may be fed in a similar manner: Large grains are directly fed into the hopper and small grains or particles are fed in a suck.

Hereinafter a specific example of the method of the present invention will be described.

In this example, the wasted metal product is an electric compressor used in an air-conditioner outdoor unit. The crusher 2, the first and the second magnetic separator 12 and 14, the vibrating conveyer 10 and the press 32 are as follows:

Crusher 2:

| | |
|---|---|
| Standard capability, | 5 T/H |
| Drive motor, | 90–132 kW |
| Inlet size (width × depth), | 900 × 1200 mm |

Magnetic separators 12 and 14:

| | |
|---|---|
| Type, | permanent magnet type |
| Magnet, | anisotropic strontium ferrite magnet |
| Surface magnetic flux density, | 800 gauss |
| Magnet size, | 320 mmW × 100 mmH × 1800 mmL |

Vibrating conveyer 10;

| | |
|---|---|
| Vibration amplitude, | 16 mm |
| Frequency, | 520 cpm |

Press 32;

| | |
|---|---|
| Pressing pressure, | 300 kg/cm$^2$ |

The compressor was detached from the outdoor unit of the air conditioner. After cutting off an accumulator from the compressor, oil in the compressor body and in the accumulator was removed. Copper pipes attached to the compressor were cut away to reduce a blending of copper into an eventually formed metal feedstock 36. The copper content in the feedstock 36 should be under 0.1 % to provide an ease to cut the metal feedstock 36.

The outputgate height of the crusher 2 was set as 30 mm to prevent a crushed motor coil (a copper wire) from winding around the iron scraps. The compressor body and the accumulator were then thrown into the crusher 2. By passing them under the first and second magnetic separator 12 and 14 while transporting by means of the vibrating conveyer 10, the iron scraps 4 and the iron blocks 6 were separated therefrom. The distance from the conveyer 10 to the first separator 12 was set to 220–240 mm and that to the second separator 14 was set to a value smaller, for example, as about 150 mm, so that the iron scraps 4 were selectively attracted by the first separator 12 and the iron blocks 6 were attracted by the second separator 14. In the case the distance to the first separator 12 was set to 150 mm, since the magnetic induction was too large, the iron scraps 4 were attracted together with the iron blocks 6 and could not separated selectively.

Figure 6:
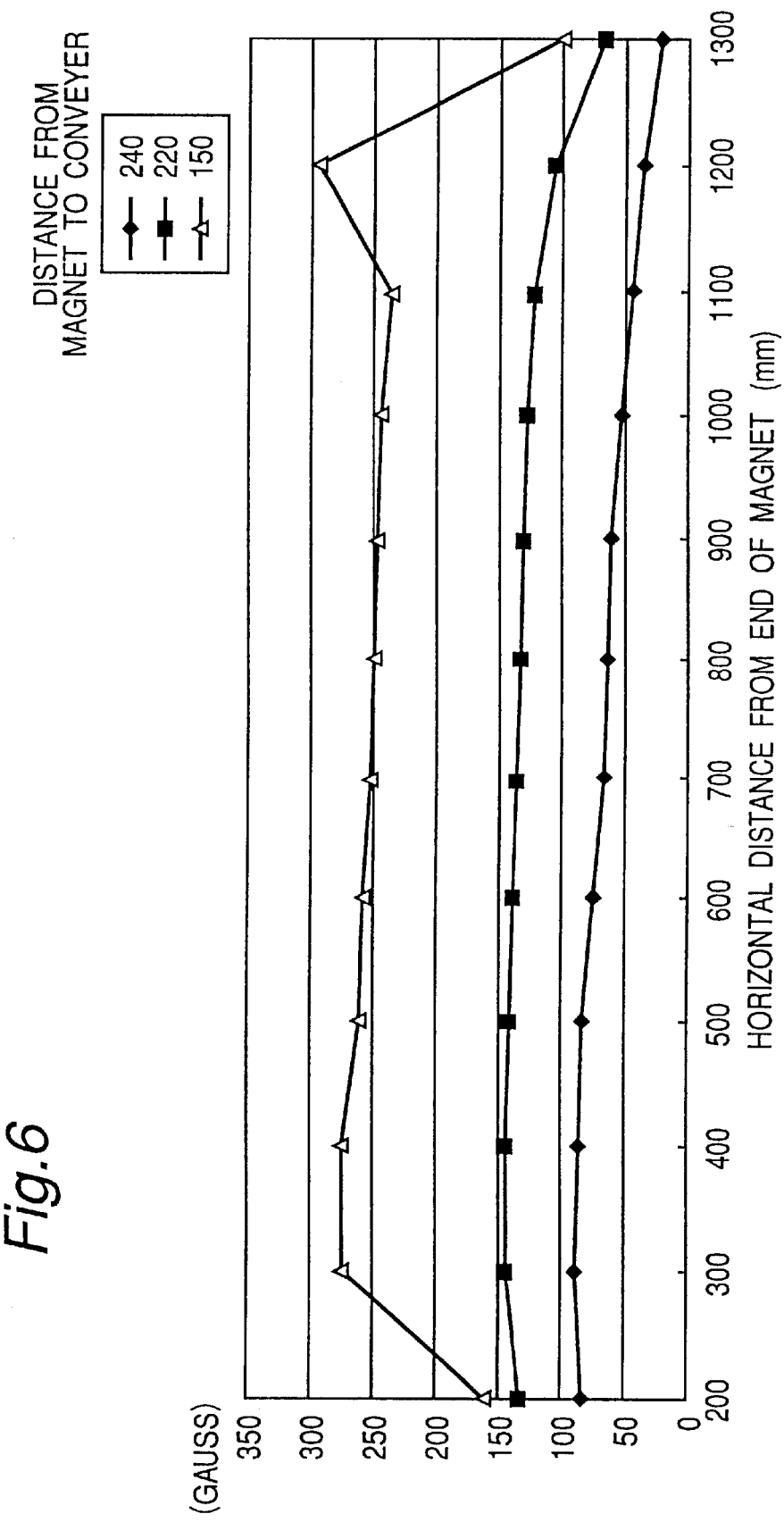
FIG. 6 is a graph showing a magnetic flux density of a magnetic separator.

A magnetic flux density measured on the conveyer 10 is shown in Table 2, where the distance from the conveyer to the magnetic separator was 150 mm, 220 mm or 240 mm. Table 2 also shows a horizontal distribution of the magnetic flux density. Table 2 is graphed out in FIG. 6. These data and the experimentation described above indicate that the first separator's magnetic flux density on the conveyer 10 should be below about 200 gausses.

TABLE 2

| | 1* | | | | | | | | | | | |
|---|---|---|---|---|---|---|---|---|---|---|---|---|
| 2* | 200 | 300 | 400 | 500 | 600 | 700 | 800 | 900 | 1000 | 1100 | 1200 | 1300 |
| 240 | 79 | 85 | 82 | 76 | 71 | 66 | 65 | 58 | 53 | 45 | 34 | 25 |
| 220 | 130 | 146 | 145 | 141 | 138 | 135 | 134 | 132 | 130 | 123 | 104 | 69 |
| 150 | 161 | 278 | 278 | 264 | 260 | 255 | 253 | 246 | 244 | 233 | 293 | 102 /gauss |

*1: a horizontal distance from the end of the magnetic separator (mm)
*2: a vertical distance from the conveyer to the magnet (mm)

The separated iron blocks 6 were further separated into two groups by a sieve: one group was over 20 mm in size and the other was under 20 mm. The blocks in the latter group were stacked with the iron scraps as shown in FIG. 4 and then pressed. A disc-shaped metal feedstock 36 as shown in FIG. 5 was thus formed. The size of the feedstock 36 was 130 mm (in diameter)×49 mm (in thickness) and the weight was about 2 kg.

It is needless to say that the larger the weight ratio of the scraps 4 to the blocks 6 is, the firmer the feedstock becomes. However, even where the weight ratio of the scraps to the blocks was only 6 to 4, the sandwich-structured disc kept assembled while falling and was usable as a feedstock. Where the ratio was 5 to 5, some of the discs disassembled while falling. However, in the case the scraps had elongated shape and was easily deformable, the scraps and the blocks could be combined even in the ratio of 2 to 8.

Although both the magnetic separators 12 and 14 used in this example have permanent magnets, a magnetic separator with an electromagnet may also be used.

If the multi-step-type conveyer is used as the conveyer 10 to drop the crushed pieces at the steps, a tangling of the crushed pieces is reduced and thus, for example, a copper content is efficiently lowered.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be constructed as being included therein.

What is claimed is:

1. A metal feedstock comprising ferrous cast blocks and sheet-shaped ferrous scraps wherein said cast blocks are disposed between said sheet-shaped scraps and pressed together to form a sandwich-structured metal feedstock.

2. The metal feedstock according to claim 1, wherein both said cast blocks and said sheet-shaped scraps are iron pieces separated from crushed metal products.

3. The metal feedstock according to claim 1, wherein the size of said cast blocks are smaller than a predetermined value.

4. The metal feedstock according to claim 1, wherein a weight percentage of said sheet-shaped scraps in said feedstock is no less than 60%.

5. The metal feedstock according to claim 1, further comprising at least one kind of component adjuster mixed with said cast blocks.

* * * * *